Oct. 11, 1960  H. BECHSTEIN ET AL  2,956,190
COMMUTATORS AND PROCESS FOR MANUFACTURING THE SAME
Filed Dec. 19, 1957

INVENTORS:
Herbert Bechstein
Günter Sokol
Alfred Prötzinger
Franz Heydenblut
by Michael S. Striker
Attorney United States Patent Office 2,956,190
Patented Oct. 11, 1960

2,956,190

COMMUTATORS AND PROCESS FOR MANU-
FACTURING THE SAME

Herbert Bechstein, Stuttgart-Unterturkheim, Günter Sokol, Stuttgart-Zuffenhausen, Alfred Grözinger, Stuttgart-Degerloch, and Franz Heydenbluth, Ludwigsburg, Germany, assignors to Robert Bosch G.m.b.H., Stuttgart, Germany Filed Dec. 19, 1957, Ser. No. 703,861

Claims priority, application Germany Dec. 19, 1956

9 Claims. (Cl. 310—235)

The present invention relates to commutators.

More particularly, the present invention relates to commutators suitable for electric machines such as generators and starting motors of automobiles.

Such commutators are composed of an axially bored body of electrically non-conductive material having the commutator segments partly embedded therein at the outer surface of the body and having a wire coil embedded therein next to the bore, and this coil is provided with spaces between its convolutions. It is conventional in the manufacture of such commutators to fasten the wire convolutions by soldering or the like to a sheet metal sleeve. However, the use of such a sleeve and the necessity of fastening the coil thereto greatly increases the manufacturing costs. For this reason it has been proposed to coil the wire in such a way that there are spaces between the convolutions. However, when such a wire is set into the form into which the electrically non-conductive material is pressed so as to form the body of the commutator, the setting of the wire in the form and the subsequent introduction of the electrically non-conductive material under pressure into the form results in shifting of the convolutions one over the other so that there are an undesirably large number of rejects.

One of the objects of the present invention is to provide a commutator construction wherein the convolutions of the wire coil cannot shift in the above manner so that the coil will be properly embedded in the body of the commutator.

Another object of the present invention is to provide a wire coil of relatively simple construction capable of preventing the above-mentioned undesirable shifting of the convolutions during manufacture of the commutator.

A further object of the present invention is to provide a wire of the above type which will reliably prevent any movement of the convolutions with respect to each other during manufacturing of the commutator and which at the same time will provide between the convolutions spaces into which the material of the commutator body can freely flow before setting of the material of the commutator body so that the coil will be securely anchored in the commutator body.

An additional object of the present invention is to provide a wire coil of the above type which will resist corrosion so that there will be no ill effects resulting from use of the structure in a damp atmosphere.

Still another object of the present invention is to provide a wire coil of the above type which will reduce the possibility of imperfections in the surface of the bore of the commutator body.

With the above objects in view the present invention includes in a commutator for an electric machine such as a generator or starting motor of an automobile an axially bored body of electrically non-conductive material having commutator segments partly embedded in and exposed at the outer surface of the body which is adapted to receive a shaft of the machine in its bore. A wire coil according to the present invention is embedded in this body next to its bore and is coiled about the axis of the bore along a helix whose convolutions are spaced from each other by distances substantially greater than the minimum cross sectional dimension of the wire. The wire has at each of its convolutions a plurality of side edge portions located beyond the helix and engaging the side edge portions of the neighboring convolutions of the wire.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
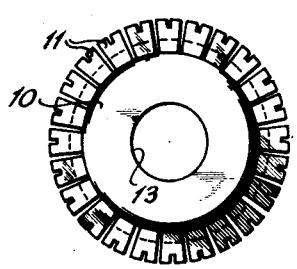
Fig. 1 is an end view of a commutator according to the present invention.
Figure 2:
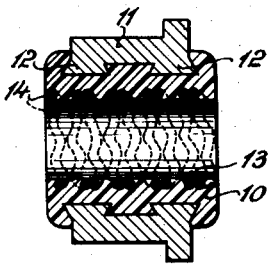
Fig. 2 is an axial sectional view of the commutator.

The commutator illustrated in Figs. 1 and 2 includes an axially bored commutator body 10 made of electrically non-conductive material as by pressing this material while it is in non-solid condition into a suitable form. The commutator segments 11 are partly embedded in the body 10 and are exposed at the outer surface thereof. These segments 11 have dove-tailed portions 12 about which the material of body 10 flows during manufacture of the commutator so that a permanent, secure anchoring of the segment 11 in the hardened material of the body 10 is provided.

A wire 14 is coiled about the axis of the bore 13 of body 10, and the coil 14 is embedded in the body 10 next to the bore 13, as shown in Fig. 2. The wire 14 may be made of steel and it has a wavy configuration as shown in Fig. 2. Each of the convolutions of the wire 14 has a plurality of wavy portions so that when the wire is coiled it may be arranged as shown in Fig. 2 with the crests of one convolution engaging the crests of the neighboring convolutions. Thus, the wire is coiled along a helix whose convolutions are spaced from each other by distances greater than the cross section of the wire 14, and the wavy configuration of the wire provides it with substantially axially extending projecting portions. Thus, with this construction the several convolutions will engage each other only at spaced areas and are otherwise out of engagement with each other so as to provide between the convolutions free spaces into which the material of the body 10 can be pressed during manufacture of the commutator in a suitable form in which the coil is located, so that a secure connection between the body 10 and coil 14 is guaranteed.

Figure 3:
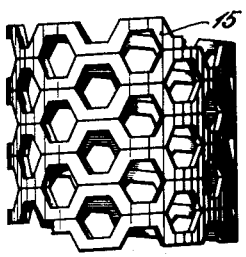
Fig. 3 is a plan view at an enlarged scale as compared to Figs. 1 and 2 of another embodiment of a commutator reinforcing coil.
Figure 4:
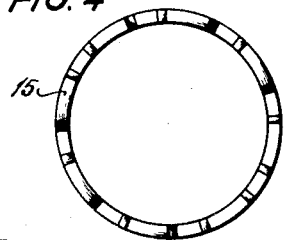
Fig. 4 is an end view of the coil of Fig. 3.

Instead of a simple wavy wire of circular cross section, as shown in Fig. 2, the coil may have the construction shown in Figs. 3 and 4 for the coil 15. This coil 15 is made from a wire of rectangular or square cross section, and the wavy configuration includes wire portions which make sharp angles with each other on the order of 60°. Therefore, when the wire of coil 15 is wound so as to form the coil shown in Fig. 3 where the elongated crests of the wavy portions engage each other, a honeycomb pattern is provided, and a pair of wavy portions of neighboring convolutions define a substantially regular hexagon, as is evident from Fig. 3. Alternating crests of one convolution engage the crests of the immediately preceding convolution, while the remaining crests of each convolution engage the crests of the next convolution. In the example shown each convolution has eight wavy portions. Because of the square or rectangular cross section of the wire, the side edges of the convolutions which engage each other are flat and have substantial areas of contact.

The coils of the present invention are thus constructed so that the convolutions thereof cannot shift during manufacture of the commutator. In order to further guarantee that no shifting takes place, a complete coil such as that shown in Fig. 3 may be plated in a galvanic bath so that the coil is provided with a thin copper coating, and then the coated coil is heated in a suitable furnace or the like in a protective atmosphere of an inert gas such as hydrogen to a temperature at which the copper coating starts to flow so as to act as a soldering material which thereafter solidifies at the relatively large areas of contact between the convolutions so as to solder the convolutions together.

Figure 5:
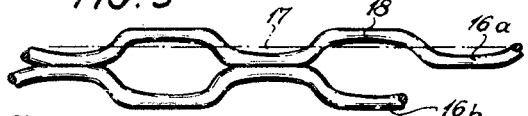
Fig. 5 is a fragmentary illustration of a further embodiment of a coil according to the present invention.

Such soldering is of particular importance with a coil made from a relatively soft wire of relatively small circular cross section having the projecting portions 18 shown in Fig. 5. The wire of Fig. 5 is of wavy configuration and will provide a honeycomb pattern when wound into a coil. The wavy configuration is given to the wire by placing it between a pair of suitable dies one of which acts similarly to a hammer to provide the wire with flattened crest portions 18. The helix along which the wire is wound is indicated at 17 in Fig. 5, and it will be noted that the convolutions of the helix are necessarily spaced from each other by distances substantially greater than the minimum cross sectional dimension of the wire, and the outer side edges of the wire at the crests 18 are flat. The engagement of these flat crests of the convolutions 16a and 16b as well as the soldering thereof to each other prevents shifting of one convolution with respect to the other and increases the stiffness of the coil considerably.

With the commutator of the invention there are far fewer rejects than with conventional commutators, and furthermore it is possible to ream the bore 13 at a faster speed than a conventional commutator so that the manufacturing time is reduced. Furthermore, there is a substantial reduction of the possibility of chipping of the commutator body during reaming of the bore thereof and consequent damaging of the reamer, so that the cost of manufacture is substantially reduced and the quality of the commutator is improved. The galvanic coating which covers substantially the entire wire acts at the same time to resist corrosion so that when the commutator is used in a damp atmosphere a secure engagement of the commutator with the machine shaft received in the bore 13 thereof is guaranteed.

Figure 6:
Fig. 6 shows a portion of another form of wire for a coil of the invention.

When the wire 20 of Fig. 6 is used for the coil of the invention a secure anchoring of the coil in the commutator body is also assured. The wire 20 is in the form of a band of rectangular cross section which is twisted about its longitudinal axis. When this wire is coiled it occupies in the axial direction a far greater space than that required by its relatively small thickness, and thus free spaces are provided between the convolutions which are filled by the material of the commutator body.

Figure 7:
Fig. 7 illustrates a still further form of a wire for the coil of the present invention.

The wire 21 of Fig. 7 which also may be used in accordance with the present invention to form a commutator reinforcing coil is in the form of an iron band of relatively small rectangular cross section having relatively short substantially rectangular portions 22 each of which makes an angle of approximately 90° with its neighboring portions. When this wire is coiled the side edge portions of one convolution engage the side edge portions of the neighboring convolutions.

As is the case with the embodiments of Figs. 1–5, the convolutions made from the wires of Figs. 6 and 7 may be fixed together by soldering or welding. For example, weldments extending parallel to the axis of the coil may be provided along the outer surface thereof with a suitable welding electrode in order to fix the convolutions to each other. It is also possible to dip a coil of wire which is capable of being soldered into a bath of tin or other suitable soldering material, so that the coating obtained in this way will serve both for soldering and for resistance to corrosion.

It will be understood that each of the elements described above, or two or more together, may also find a useful application in other types of commutators differing from the types described above.

While the invention has been illustrated and described as embodied in reinforced commutators, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a commutator for an electric machine such as a generator or starting motor of an automobile, in combination, an axially bored body of electrically non-conductive material having commutator segments partly embedded in and exposed at the outer surface of said body and adapted to receive a shaft of the machine in its bore; and a metal wire coil embedded in said body next to said bore thereof and coiled about the axis of said bore along a helix whose convolutions are spaced from each other, each convolution of the wire having portions, spaced apart along said convolution, which project in a generally axial direction into engagement with corresponding projections of the neighboring convolutions of the wire to maintain the wire convolutions along said helix, the spaces between said convolutions and said projections being completely filled with said electrically non-conductive material.

2. In a commutator for an electric machine such as a generator or starting motor of an automobile, in combination, an axially bored body of electrically non-conductive material having commutator segments partly embedded in and exposed at the outer surface of said body and adapted to receive a shaft of the machine in its bore; and a wire coil embedded in said body next to said bore thereof and coiled about the axis of said bore along a helix whose convolutions are spaced from each other by distances substantially greater than the minimum cross sectional dimension of the wire, said wire being in the form of an elongated twisted band of rectangular cross section, each convolution of the wire having a plurality of side edge portions located beyond said helix and engaging the side edge portions of the neighboring convolutions of the wire.

3. In a commutator for an electric machine such as a generator or starting motor of an automobile, in combination, an axially bored body of electrically non-conductive material having commutator segments partly embedded in and exposed at the outer surface of said body and adapted to receive a shaft of the machine in its bore; and a metal wire coil embedded in said body next to said bore thereof and coiled about the axis of said bore, said wire of said coil having a wavy configuration and each convolution of said coil having a plurality of wavy portions the crests of which engage the crests of the wavy portions of the neighboring convolutions of the wire, the spaces between said convolutions being completely filled with said electrically non-conductive material.

4. In a commutator as recited in claim 3, said wire having a circular cross section at all portions except said crests of said wavy portions, and said crests having substantially flat side faces, the flat side faces of the crests of each convolution of the wire being located next to the flat side faces of the crests of the neighboring convolutions.

5. In a commutator as recited in claim 2, said wire being in the form of an elongated band of rectangular cross section having a plurality of successive substantially rectangular portions each of which makes an angle of at least 60° with its neighboring rectangular portions, and each convolution of the wire having at least three of said rectangular portions.

6. In a commutator as recited in claim 2, said engaging side edge portions of the wire convolutions being fixed to each other.

7. In a commutator as recited in claim 2, said engaging side edge portions of the wire convolutions being soldered to each other.

8. In a commutator as recited in claim 2, said engaging side edge portions of the wire convolutions being soldered to each other with a soldering material which coats substantially the entire wire and forms a corrosion-resistant coating therefor.

9. In a process for manufacturing a commutator according to claim 8, performing before the wire is embedded in the electrically non-conductive material the steps of forming said wire into a substantially cylindrical coil, each convolution of said coil having projecting portions extending in the same general direction as said axis spaced apart along said convolution and maintaining with said projecting portions the neighboring convolutions at an axial distance corresponding to the axial dimensions of said projecting portions, dipping the wire into and removing the wire from a galvanic bath of the soldering material to provide the wire with a coating of the soldering material, and then heating the coated wire to a temperature above the melting point of the soldering material.

References Cited in the file of this patent

UNITED STATES PATENTS

| | | |
|---|---|---|
| 1,117,965 | Becker | Nov. 24, 1914 |
| 2,654,124 | Layte | Oct. 6, 1953 |
| 2,765,511 | Greene | Oct. 9, 1956 |

FOREIGN PATENTS

| | | |
|---|---|---|
| 107,637 | Sweden | June 15, 1943 |
| 871,332 | Germany | Mar. 23, 1953 |